United States Patent
Hyde, II et al.

(10) Patent No.: US 9,697,139 B2
(45) Date of Patent: *Jul. 4, 2017

(54) ENHANCING DATA CACHING PERFORMANCE

(71) Applicant: INTERNATIONAL BUSINESS MACHINES CORPORATION, Armonk, NY (US)

(72) Inventors: Joseph S. Hyde, II, Tucson, AZ (US); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/801,486

(22) Filed: Mar. 13, 2013

(65) Prior Publication Data

US 2013/0297886 A1    Nov. 7, 2013

Related U.S. Application Data

(63) Continuation of application No. 13/465,476, filed on May 7, 2012.

(51) Int. Cl.
*G06F 12/122* (2016.01)
*G06F 12/123* (2016.01)

(52) U.S. Cl.
CPC .......... *G06F 12/122* (2013.01); *G06F 12/123* (2013.01)

(58) Field of Classification Search
CPC ......... G06F 17/30156; G06F 17/30221; G06F 17/30088; G06F 17/30489; G06F 17/30097; G06F 17/30067; G06F 12/0891; G06F 12/123; G06F 12/122
See application file for complete search history.

(56) References Cited

U.S. PATENT DOCUMENTS

| | | | |
|---|---|---|---|
| 5,276,867 A | 1/1994 | Kenley et al. | |
| 6,353,438 B1 | 3/2002 | Van Hook et al. | |
| 6,654,855 B1* | 11/2003 | Bopardikar et al. | 711/133 |
| 7,496,711 B2 | 2/2009 | Bartley et al. | |
| 7,567,188 B1 | 7/2009 | Anglin et al. | |
| 7,822,939 B1* | 10/2010 | Veprinsky et al. | 711/170 |

(Continued)

FOREIGN PATENT DOCUMENTS

| | | |
|---|---|---|
| CN | 1149486 C | 5/2004 |
| CN | 101989236 A | 3/2011 |
| WO | 2010040078 A2 | 4/2010 |

OTHER PUBLICATIONS

Massiglia, Paul, Exploiting Multi-tier File Store Effectively, 32, Storage Networking Industry Association.

*Primary Examiner* — David X Yi
*Assistant Examiner* — Tahilba Puche
(74) *Attorney, Agent, or Firm* — Griffiths & Seaton PLLC

(57) ABSTRACT

For a cache in which a plurality of frequently accessed data segments are temporarily stored, reference count information of the plurality of data segments, in conjunction with least recently used (LRU) information, is used to determine a length of time to retain the plurality of data segments in the cache according to a predetermined weight, where notwithstanding the LRU information, those of the plurality of data segments having a higher reference counts are retained longer than those having lower reference counts.

5 Claims, 5 Drawing Sheets

(56) References Cited

U.S. PATENT DOCUMENTS

| | | |
|---|---|---|
| 8,204,862 B1 | 6/2012 | Paulzagade et al. |
| 8,280,854 B1 | 10/2012 | Emmert |
| 8,407,191 B1 | 3/2013 | Nanda |
| 8,433,689 B1 | 4/2013 | Paulzagade et al. |
| 8,495,304 B1 | 7/2013 | Natanzon et al. |
| 8,578,120 B2 | 11/2013 | Attarde et al. |
| 8,732,403 B1 | 5/2014 | Nayak |
| 2003/0163644 A1* | 8/2003 | Hoang et al. ............... 711/136 |
| 2007/0198779 A1* | 8/2007 | Wang ........................... 711/136 |
| 2008/0243914 A1 | 10/2008 | Prahlad et al. |
| 2008/0288657 A1 | 11/2008 | Ushiyama |
| 2009/0132619 A1 | 5/2009 | Arakawa et al. |
| 2009/0204765 A1* | 8/2009 | Gupta et al. ................. 711/133 |
| 2010/0274826 A1 | 10/2010 | Takata et al. |
| 2010/0306175 A1* | 12/2010 | Johnson et al. .............. 707/663 |
| 2010/0312752 A1 | 12/2010 | Zeis et al. |
| 2010/0333116 A1* | 12/2010 | Prahlad et al. ............... 719/328 |
| 2011/0010514 A1* | 1/2011 | Benhase et al. .............. 711/162 |
| 2011/0029497 A1 | 2/2011 | Benhase et al. |
| 2011/0107052 A1* | 5/2011 | Narayanasamy ............. 711/171 |
| 2011/0131390 A1 | 6/2011 | Srinivasan et al. |
| 2011/0161723 A1 | 6/2011 | Taleck et al. |
| 2011/0197046 A1 | 8/2011 | Chiu et al. |
| 2011/0246741 A1 | 10/2011 | Raymond et al. |
| 2011/0258374 A1 | 10/2011 | Pertocelli |
| 2012/0011318 A1* | 1/2012 | Hasegawa .................... 711/114 |
| 2012/0030477 A1 | 2/2012 | Lu et al. |
| 2012/0137061 A1* | 5/2012 | Yang et al. ................... 711/105 |
| 2012/0137081 A1* | 5/2012 | Shea ............................ 711/145 |
| 2012/0150826 A1 | 6/2012 | Vijayan Retnamma et al. |
| 2013/0013850 A1 | 1/2013 | Baderdinni |
| 2013/0297569 A1 | 11/2013 | Hyde, II et al. |
| 2013/0297872 A1 | 11/2013 | Hyde, II et al. |
| 2013/0297873 A1 | 11/2013 | Hyde, II et al. |
| 2013/0297884 A1 | 11/2013 | Hyde, II et al. |
| 2013/0297885 A1 | 11/2013 | Hyde, II et al. |
| 2015/0205528 A1 | 7/2015 | Hyde, II et al. |
| 2015/0293848 A1 | 10/2015 | Hyde, II et al. |

* cited by examiner

ENHANCING DATA CACHING PERFORMANCE

CROSS REFERENCE TO RELATED APPLICATIONS

This application is a Continuation of U.S. patent application Ser. No. 13/465,476, filed on May 7, 2012.

FIELD OF THE INVENTION

The present invention relates in general to computers, and more particularly to a method, system, and computer program product for enhancing data caching performance in computing storage environments.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Many multi-tiered/multi-system computing environments implement data deduplication technologies to improve storage performance by reducing the amount of duplicated storage across storage devices. Data deduplication systems are increasingly utilized because they help reduce the total amount of physical storage that is required to store data. This reduction is accomplished by ensuring that duplicate data is not stored multiple times. Instead, for example, if a chunk of data matches with an already stored chunk of data, a pointer to the original data is stored in the virtual storage map instead of allocating new physical storage space for the new chunk of data. Thus each chunk of data in a data deduplication system is associated with a "reference counter" that indicates how many virtual map elements are pointing to a given chunk of data.

Inline data deduplication systems must maintain the aforementioned virtual storage mapping information (including reference counter information) in-memory for fast access to data. Otherwise, an additional map fault penalty is incurred when fetching mapping information from physical storage, which thereby significantly increases storage latency. Such storage mapping information is thereby readily available for use by other storage components within the Storage Controller.

Conventional data caching algorithms (mechanisms that dictate how long frequently used files are retained in cache as opposed to being paged out to disk) may implement so-called "least recently used" (LRU) methodologies, where files that were least recently used are discarded (paged out) first. These methodologies require keeping track of what was used when, which may be resource intensive if one wishes to ensure that the algorithm always discards the least recently used item, and may still not always accurately represent the best files to retain in cache and which files not to retain under a certain set of circumstances. A need exists for a more effective way of cache management of frequently used data segments.

In view of the forgoing need to better manage the caching of such data, various embodiments for improving caching performance in a computing environment by a processor are provided. In one embodiment, by way of example only, for a cache in which a plurality of frequently accessed data segments are temporarily stored, reference count information of the plurality of data segments, in conjunction with least recently used (LRU) information, is used to determine a length of time to retain the plurality of data segments in the cache according to a predetermined weight, where notwithstanding the LRU information, those of the plurality of data segments having a higher reference counts are retained longer than those having lower reference counts.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, a variety of data caching algorithms implement various schemes of LRU methodologies, where files identified as least recently used are earmarked to be paged out to hard storage (e.g., disk or tape) from the cache. However, in data storage environments having data deduplication functionality (such as an integrated data deduplication engine), each LRU-based methodology fails to take into account readily-available reference count information that indicates, inter alia, the number of virtual instances of a data chunk that point to a given physically stored data chunk.

The most efficient data-caching algorithm would be to always discard the information that will not be needed for the longest time in the future. Conventional data caching algorithms attempt to reach this utopian state, yet always fall short. As such there is always a present need to improve the mechanisms by which that information is retained in cache or discarded. To address and improve upon the current state of the art, the illustrated embodiments describe mechanisms to utilize the reference count information previously described as provided by the data deduplication subsystem to enhance (for example, when used in conjunction with LRU information) data caching algorithms by giving such algorithms, at least in part, a better picture about the state of the data in cache, and thereby improve the overall performance of the storage environment.

Storage systems that incorporate data deduplication functionality implement a reference count for each segment of data, which indicates, for example, how many segments of virtual storage map onto a single segment of physical storage. Reference count information is generally readily available, as such reference count functionality is found in most, if not all, inline data deduplication systems. By improving caching performance of data chunks in storage configurations featuring data deduplication subsystems, the average latency of input/output (I/O) operations in the storage environment as a whole may be significantly reduced.

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
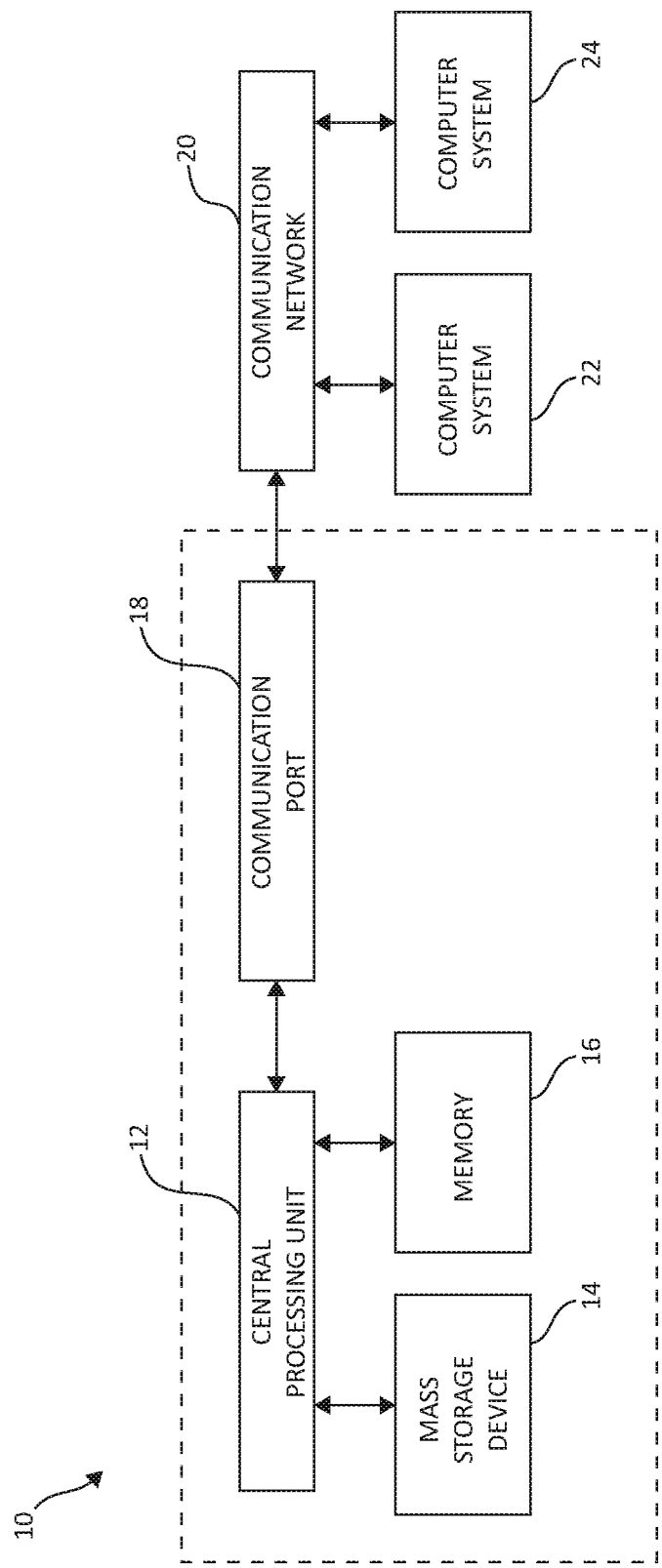
FIG. 1 is a block diagram illustrating an exemplary computing environment which may implement aspects of the present invention.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The cache management operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
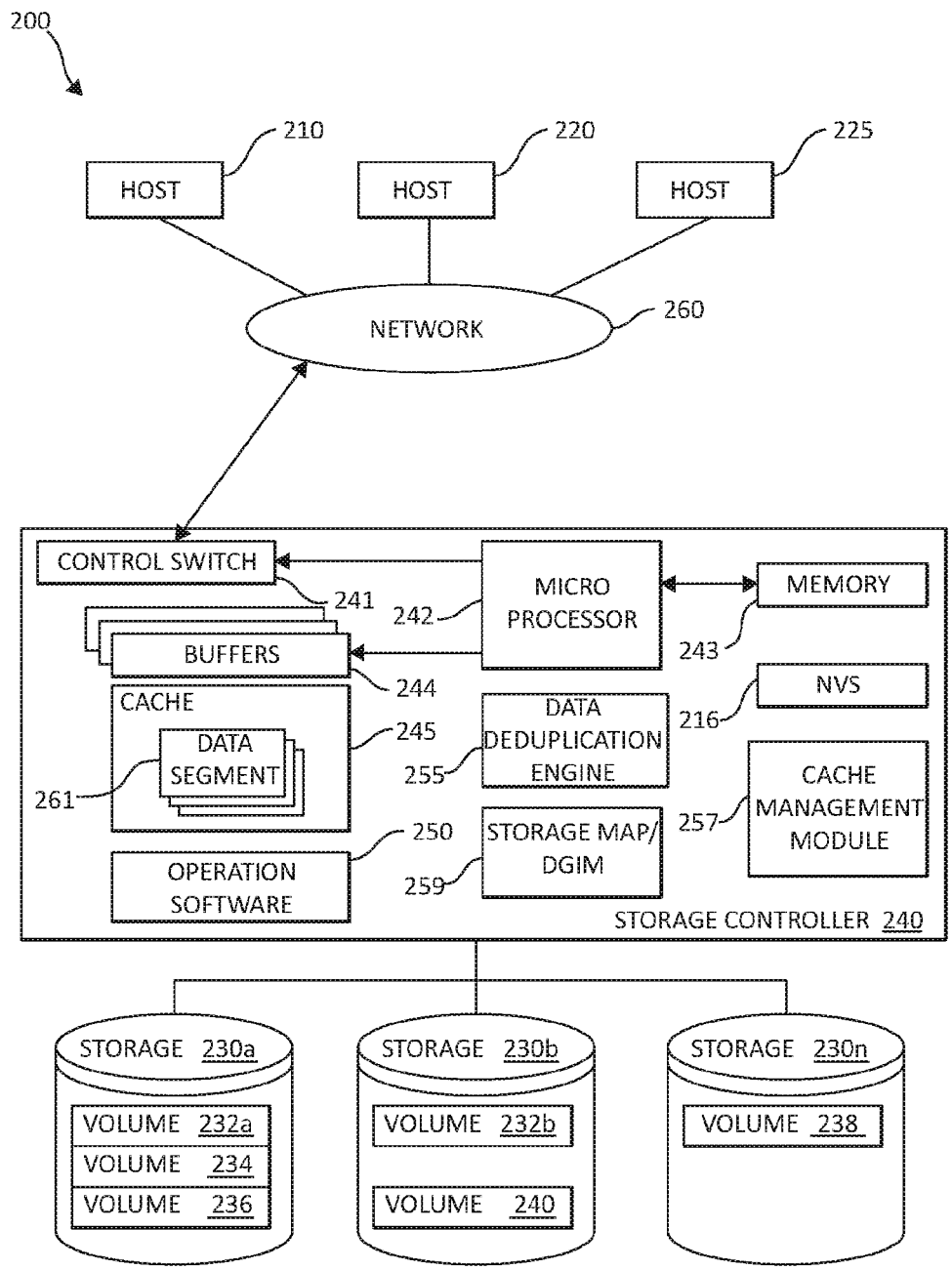
FIG. 2 is a block diagram showing a hardware structure of a data storage system, again in which aspects of the present invention may be implemented.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data that the processor 242 may access for executing functions associated with managing storage 230. In one embodiment, system memory 243 includes, is associated, or is in communication with the operation software 250, and configured in part for accomplishing functionality of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data deduplication engine 255, cache management module 257, and storage map/data frequency index map (DFIM) 259 as will be further described. The cache management module 257 may work in conjunction with each and every component of the storage controller 240, the hosts 210, 220, 225, and storage devices 230. The cache management module 257 may be, as one of ordinary skill in the art will appreciate, structurally one complete module or may be associated and/or included with other individual modules. The cache management module 257 and/or storage map/DFIM 259 may also be located in the cache 245 or other components. Cache 245 is shown including a number of frequently used data segments 261 which are retained in the cache for quick access, and whose management is performed by the cache management module 257, among other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and compression operation module 255 and compression operation list module 257 in which information may be set. Multiple buffers 244 may be implemented with the present invention to assist with the operations as described herein.

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, compression operation module 255 and compression operation list module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

The storage controller 240 is shown including a data deduplication engine 255, storage map/data frequency index map (DFIM) 259 ("storage map" 259), and cache management module 257. The data deduplication engine 255, cache management module 257 and DFIM 259 may operate in conjunction with each and every component of the storage controller 240, the hosts, 210, 220, 225, and storage devices 230, to accomplish functionality according to the present invention. The data deduplication engine 255, cache management module 257 and DFIM 259 may be structurally one complete module or may be associated and/or incorporated within other individual modules. The cache management module 257 and DFIM 259 may also be incorporated in the cache 245 or other components.

Data deduplication engine 255 is configured for performing, in conjunction with other components of storage controller 240 such as microprocessor 242, data deduplication operations on write data passed through storage controller 240 to storage 230.

As previously indicated, storage controller 240 includes a data frequency index map (DFIM) 259, or storage map 259 for short. Cache 245 (or what may be termed holistically as cache system 245 (which may incorporate cache management module 257, storage map 259, or even data deduplication engine 255) accepts write data from hosts 210, 220, and 225, or similar devices, that is then placed in cache memory 245. Data deduplication engine 255 then tests the write data for duplication in the cache memory 245 and writes an index and frequency for such in the storage map 259.

Figure 3:
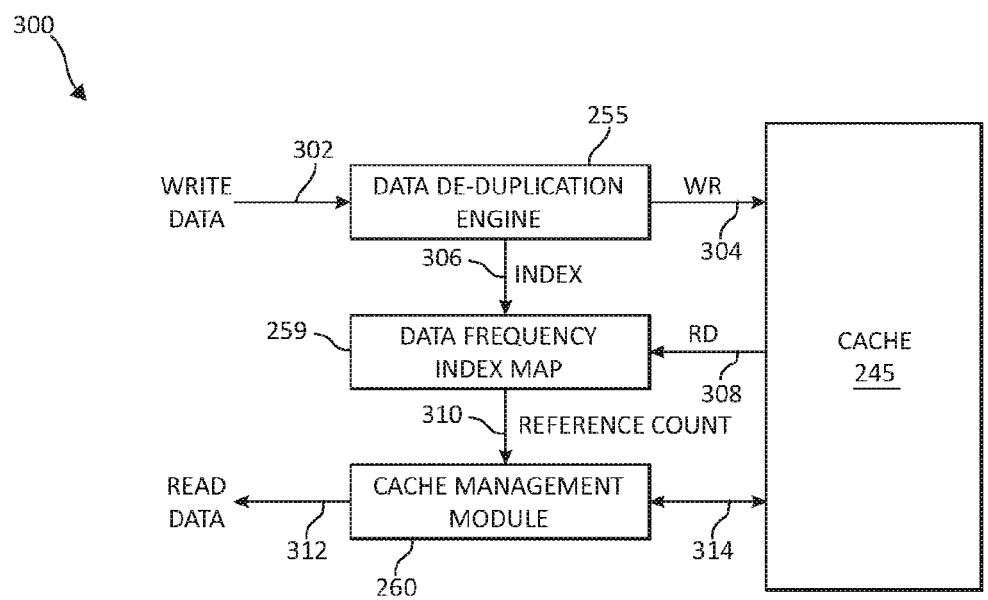
FIG. 3 is a block diagram of a cache system embodiment of the present invention illustrating a relationship between data deduplication system and cache management module for improving caching performance.

Turning now to FIG. 3, a block diagram of various functional aspects of the present invention are depicted as an exemplary flow. Specifically, cache system 245 is shown to accept write data 302 to be processed through data deduplication engine 255 as a write operation 304 to cache 245. As the write data 302 is processed through the data deduplication engine 255, and as previously described, the write data 302 is tested for duplication with existing storage, and the deduplication engine 255 passes the frequency and index information 306 to the storage/data frequency index map (DFIM) 259. Storage systems that incorporate data deduplication functionality as shown in FIG. 3, include a reference count for each chunk of data, which indicates how many chunks of virtual storage map onto a single chunk of physical storage, among other indications.

As data is read 308 out of the cache 245, the storage map 259 is updated. The information contained in storage map 259 is provided, including reference count information 310, to the cache management module 260, which is also in bi-directional communication 314 between the cache 245 and the storage controller 240 (FIG. 2), and thereby hosts 210, 220, and 225 as read data 312. Based at least in part on such activity, the cache management module 260 may determine which of portions of the write data 302 to be placed in the cache system 245 and for what appropriate length of time as will be further illustrated, according to aspects of the present invention.

Figure 4:
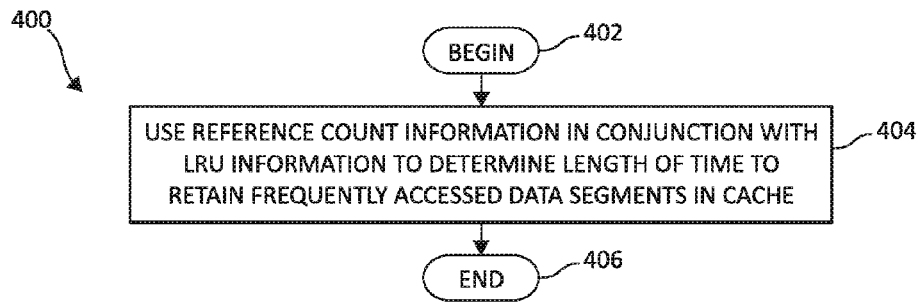
FIG. 4 is a flow chart diagram of an exemplary embodiment for enhancing data caching performance in which aspects of the present invention may be implemented.

Turning now to FIG. 4, a flow chart diagram of a method for improving caching performance in a storage environment is shown in one exemplary embodiment. Method 400 begins (step 402) by using the aforementioned reference count information in conjunction with LRU information (and, in other embodiments, other statistical information apparent to one of ordinary skill in the art) to determine an appropriate length of time to retain particular frequently accessed data segments 261 (FIG. 2) in cache 245 (step 404). The method 400 ends (step 406).

Figure 5:
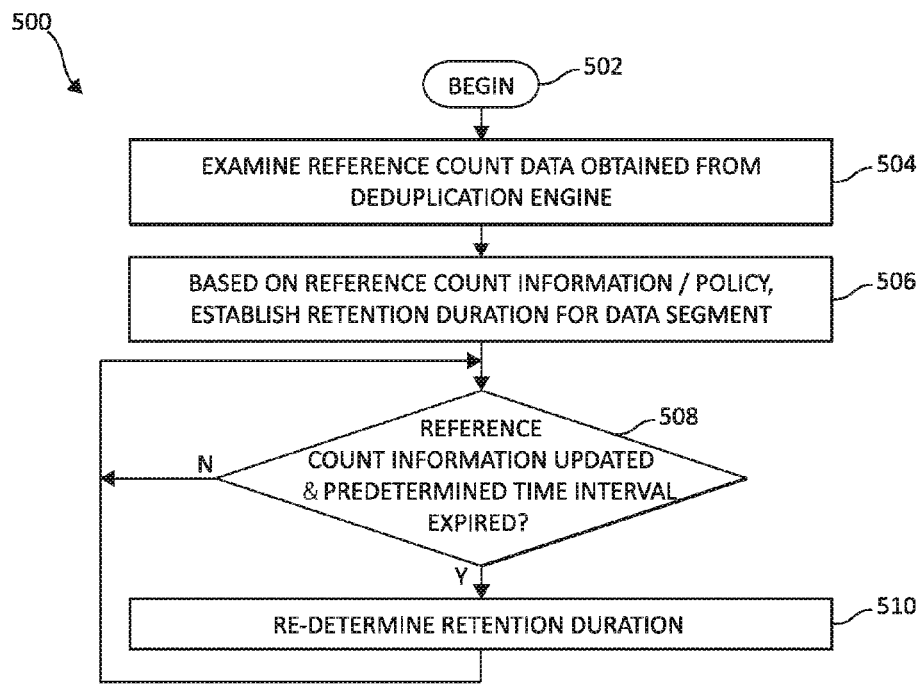
FIG. 5 is a flow chart diagram of an additional exemplary embodiment for enhancing data caching performance, again in which aspects of the present invention may be implemented.

FIG. 5, following, is a flow chart diagram of a method for implementing such utilization of reference count information, as shown previously in FIG. 4, in a further exemplary embodiment. Here, method 500 begins (step 502) by examining reference count data obtained from the deduplication engine in the course of a deduplication operation as previously described (step 504). In one embodiment, the reference count information for a particular data chunk may be obtained/examined in approximate synchronization with the performance of a deduplication operation for that selected data chunk. Based on the reference count information (and/or by implementation of a particular storage policy), a retention duration for a particular segment, or for a number of segments in the cache, is established (step 506). Here again, in one embodiment, the obtaining of reference count information, update of reference count information, examination of reference count information, and/or analysis of reference count information to determine a particular retention duration may occur in approximate synchronization with the performance of the aforementioned deduplication operation.

Continuing with FIG. 5, the method 500 then queries if the reference count information for the referenced data segment has been updated (e.g., incremented pursuant to a deduplication operation), or whether, for example, a predetermined time interval has expired (step 508). If this is the case, the retention duration that was previously established in step 506 is revisited to re-determine a new appropriate duration of retention in the cache (step 510). In one embodiment, this may be performed by assigning a predetermined weight initially to a data segment that correlates to the reference count information, which, following the expiration of the predetermined period of time, decreases if the reference count information is not incremented. The intent of assigning a weight, among other considerations, allows for those data segments with high reference counts to be eventually discarded from the cache, even if the data segments are not accessed for a long period of time.

Returning to step 508, if the reference count information is not updated and the predetermined time interval is not expired, the method 500 returns to step 508 with the passage of time to again query whether either or both of these conditions has been satisfied.

As one of ordinary skill in the art will appreciate, a wide variety of storage policies (which may, for example, be established with the assistance of a administrator/user) may be brought to bear on whether a particular segment or set of data should be retained for a certain duration, based on the current reference count information for that entry or set of entries. Since reference count information indicates, for a given segment of data, the likelihood of a particular entry being accessed, this same information may be intelligently used by such policies or otherwise in map caching mechanisms (such as a map caching algorithm that may be implemented by the cache management module previously described) in order to determine those candidate entries stored in the storage map that should be paged out from cache memory.

In view of the foregoing, consider the following example. Ten (10) mapping table entries (data segments) are established as candidates for being paged out. Of those ten mapping table entries, those that contain higher reference counts (for all data segments together, in one embodiment) will be paged out later than those that have a lower reference count. In this manner, storage map portions having corresponding higher reference counts are retained longer, with the expectation that they will be reused again, and when this occurs, the particular entry will be found in cache for fast access.

Figure 6:
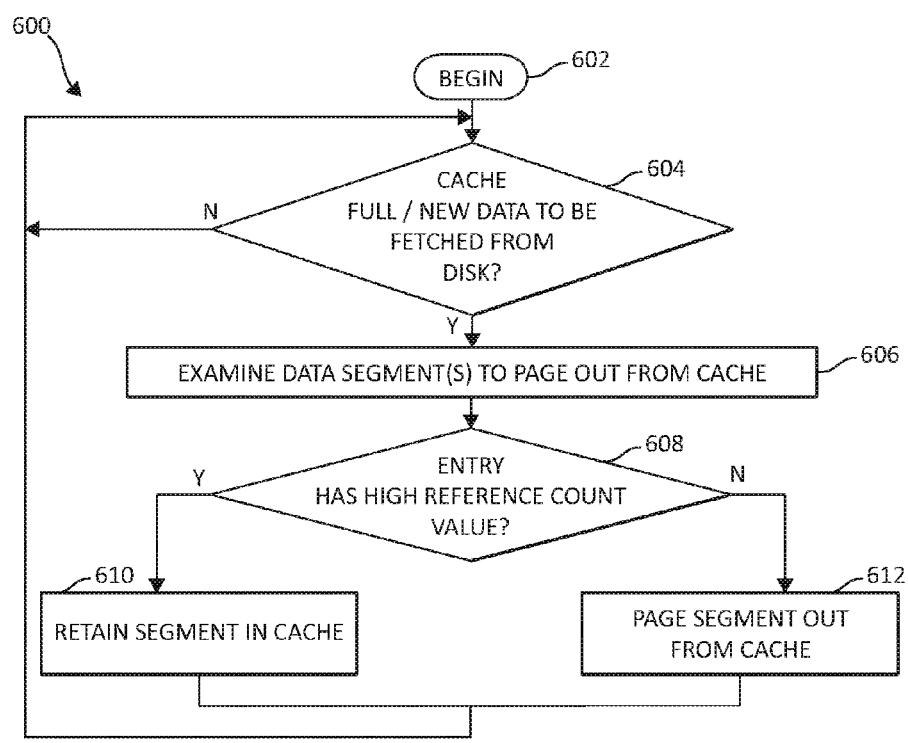
FIG. 6 is a flow chart diagram of an exemplary embodiment for cache management of data segments, again in which aspects of the present invention may be implemented.

FIG. 6, following, illustrates a flow chart diagram of an exemplary method for management of retention of data in cache using reference count values, in which aspects of the present invention may be implemented. Method 600 begins (step 602) with a query as to whether the cache is full, and whether despite this fact new data segments are to be fetched from disk (thereby requiring other map entries to be paged out) (step 604). If this is the case, the data segments are collectively examined to determine which of those segments to page out from cache (step 606). As part of this examination process, method 600 then queries if a particular examined entry has a reference count value that is high (for example, in one embodiment, above a particular threshold set by policy), or/and has or/and continues to has a corresponding heavy assigned weight (step 608). If this is the case, the entry is retained in cache (step 610). If the entry is determined not to have a high value and/or weight above a predefined threshold, the data segment is designated to be paged out from cache (step 612) and a new segment may be paged into cache in its place. The method 600 then continues/returns to step 604 as previously described.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for improving caching performance in a computing environment by a processor, comprising:
   a cache in which a plurality of data segments that are frequently accessed and are temporarily stored, and in conjunction with the cache using least recently used (LRU) information,
   obtaining and examining reference count information concurrent with a deduplication operation for those of the plurality of data segments retained in the cache, wherein the reference count information is a number of chunks of virtual storage that map onto a single chunk of physical storage,
   using the reference count information of the plurality of data segments to add to the cache the plurality of data segments and using the reference count information, the LRU information, statistical information, and a data storage policy to determine a length of time to retain each one of the plurality of data segments in the cache according to a predetermined weight correlated to the reference count information, assigned to each one of the plurality of data segments, wherein notwithstanding yet considering the LRU information, those of the plurality of data segments having a higher reference counts are retained longer in the cache than those having lower reference counts,
   determining if the reference count information of the plurality of data segments added to the cache has been updated and a predetermined time interval has expired, wherein if the reference count information has not been updated or the predetermined time interval has not expired:
      redetermining if the reference count information of the plurality of data segments added to the cache has been updated and the predetermined time interval has expired following a second predetermined time interval,
      re-determining a length of time following an expiration of the predetermined time interval, wherein the predetermined weight decreases according to the passage of the predetermined time interval, and adding to or removing from the cache portions of the plurality of data segments in the cache based on the reference count information.

2. The method of claim 1, further including obtaining the reference count information from a data deduplication engine.

3. The method of claim 1, wherein determining the length of time to retain the plurality of data segments in cache includes implementing at least one policy corresponding to each of: the length of time to retain the plurality of data segments in cache, at least one of the plurality of data segments, and the predetermined weight.

4. The method of claim 1, wherein determining the length of time to retain the plurality of data segments in cache includes performing a deduplication operation for those of the plurality of data segments retained in the cache concurrent with the determining.

5. The method of claim 1, further including re-determining the length of time to retain the plurality of data segments in cache based on an update to the reference count information, wherein the predetermined weight decreases according to a decrease in the reference count, and increases according to an increase in the reference count.

* * * * *